(12) United States Patent
Yu et al.

(10) Patent No.: US 10,372,652 B2
(45) Date of Patent: Aug. 6, 2019

(54) USB HUB

(71) Applicant: PROLIFIC TECHNOLOGY INC., Taipei (TW)

(72) Inventors: Tien-Wei Yu, Taipei (TW); Cheng-Sheng Chan, Taipei (TW); Chun-Hsu Chen, Taipei (TW); Ren-Jie Duan, Taipei (TW)

(73) Assignee: PROLIFIC TECHNOLOGY INC., Taipei (TW)

(*) Notice: Subject to any disclaimer, the term of this patent is extended or adjusted under 35 U.S.C. 154(b) by 0 days.

(21) Appl. No.: 16/002,625

(22) Filed: Jun. 7, 2018

(65) Prior Publication Data

US 2019/0087375 A1  Mar. 21, 2019

(30) Foreign Application Priority Data

Sep. 20, 2017 (TW) .............................. 106132317 A

(51) Int. Cl.
*G06F 13/40* (2006.01)
*G06F 13/42* (2006.01)

(52) U.S. Cl.
CPC ...... *G06F 13/4027* (2013.01); *G06F 13/4282* (2013.01); *G06F 2213/0042* (2013.01)

(58) Field of Classification Search
CPC .................... G06F 13/4282; G06F 2213/0042
USPC .......................................................... 710/5
See application file for complete search history.

(56) References Cited

U.S. PATENT DOCUMENTS

| | | | | |
|---|---|---|---|---|
| 9,558,144 B2* | 1/2017 | Nge | ..................... | G06F 13/382 |
| 9,852,097 B2* | 12/2017 | Steele | ................ | G06F 13/4022 |
| 9,864,711 B2* | 1/2018 | Wang | ..................... | G06F 13/36 |
| 9,911,011 B1* | 3/2018 | Lin | ..................... | G06F 12/1458 |
| 10,162,788 B2* | 12/2018 | Shetty | ................ | G06F 13/4282 |
| 2006/0227759 A1* | 10/2006 | Bohm | ................ | G06F 13/4022 370/351 |
| 2007/0255885 A1* | 11/2007 | Bohm | ................ | G06F 13/4022 710/316 |
| 2013/0179604 A1* | 7/2013 | Lai | ..................... | G06F 11/3068 710/16 |
| 2015/0309954 A1* | 10/2015 | Moore | ................ | G06F 13/426 710/316 |
| 2016/0232122 A1* | 8/2016 | Margabandu | ........... | G06F 13/00 |
| 2016/0371213 A1* | 12/2016 | Voto | ..................... | G06F 13/4022 |
| 2017/0010997 A1* | 1/2017 | Lin | ..................... | G06F 13/4022 |
| 2018/0052799 A1* | 2/2018 | Shetty | ................ | G06F 13/4282 |

* cited by examiner

*Primary Examiner* — Christopher B Shin
(74) *Attorney, Agent, or Firm* — Rabin & Berdo, P.C.

(57) ABSTRACT

A USB hub includes an upstream port; a first USB device control unit for performing packet format conversion; an FIFO circuit for storing data outputted from the first host; a second USB device control unit for performing packet format conversion; and a plurality of downstream ports. When any one of the downstream ports is coupled to the mobile device, if the first host commands the mobile device to switch to a host role from a device role, the mobile device temporarily disconnects from the USB hub, and the first host commands the USB hub to change an internal routing path. After the mobile device switches to the host role, the first host still performs the host role, and the first USB device control unit performs the device role; the mobile device performs the host role, and the second USB device control unit performs the device role.

9 Claims, 5 Drawing Sheets

USB HUB

This application claims the benefit of Taiwan application Serial No. 106132317, filed Sep. 20, 2017, the subject matter of which is incorporated herein by reference.

BACKGROUND OF THE INVENTION

Field of the Invention

The invention relates in general to a compound universal serial bus (USB) hub having a host-to-host function.

Description of the Related Art

Traditionally, when the mobile device is coupled to a host (a notebook computer, a desk-top computer or a car system) through a universal serial bus (USB), the mobile device acts as a slave device.

However, due to the growing popularity and powerful hardware function, it is possible that the mobile device (such as a smart phone) may gradually replace the role of the notebook computer, the desk-top computer or the car system. That is, the mobile device has changed to a host from a slave device.

Since the USB can be used in a wide range of application, the device (such as the mobile phone, the desk-top computer or the notebook computer) having a USB host function may need to be connected to a USB hub for connecting other peripheral USB devices. According to the original design of the USB hub, the USB hub has an upstream port and multiple downstream ports for connecting to the host and other peripheral USB devices respectively. The downstream port of the USB hub only has a host-to-device function and does not have a host-to-host function. However, along with the rapid growth of the mobile device, the host-to-host mode has become an inevitable trend.

Therefore, it has become a prominent task for the industries to provide a new USB hub design capable of supporting both the "host-to-host" mode and the "host-to-device" mode. When the mobile device is in the host-to-host mode, the mobile device is connected to the downstream port of the USB hub but still operates as a host.

SUMMARY OF THE INVENTION

According to one embodiment of the present invention, a universal serial bus (USB) hub is provided. The USB hub includes an upstream port, a first USB device control unit, a first in first out (FIFO) circuit, a second USB device control unit, and a plurality of downstream ports. The upstream port is coupled to a first host. The first USB device control unit is coupled to the upstream port for performing packet format conversion. The FIFO circuit is coupled to the first USB device control unit for storing data outputted from the first host. The second USB device control unit is coupled to the FIFO circuit for performing packet format conversion. The downstream ports are coupled to the second USB device control unit. When any one of the downstream ports is coupled to the mobile device, if the first host commands the mobile device to switch to a host role from a device role, the mobile device temporarily disconnects from the USB hub, and the first host commands the USB hub to change an internal routing path. After the mobile device switches to the host role, the first host still performs the host role, and the first USB device control unit performs the device role; the mobile device performs the host role, and the second USB device control unit performs the device role. The first host and the first USB device control unit are paired. The mobile device and the second USB device control unit are paired.

According to another embodiment of the present invention, a universal serial bus (USB) hub is provided. The USB hub includes an upstream port, a hub function module, a host-to-host function module, at least one control module, a virtual hub function unit, and a plurality of downstream ports. The upstream port is coupled to a first host. The hub function module is coupled to the upstream port for performing a hub function. The host-to-host function module is coupled to the upstream port, wherein when the mobile device connected to the USB hub performs a device role, under the control of the hub function module, signals are transmitted between the first host and the mobile device flow via a bypass path or a host-to-host function module, which realizes a "host-to-host mode". The at least one control module is coupled to the upstream port and controls at least one device connected thereto. The virtual hub function unit is coupled to the hub function module, the host-to-host function module and the at least one control module. The virtual hub function unit supports a virtual hub function and stores a plurality of virtual USB address, and has a function of storing the relationship between the USB address and relevant devices. The downstream ports are coupled to the second USB device control unit. The virtual hub function unit specifies respective virtual USB address of the hub function module, the host-to-host function module and the at least one control module according to a USB address specified by the first host.

The above and other contents of the invention will become better understood with regard to the following detailed description of the preferred but non-limiting embodiment(s). The following description is made with reference to the accompanying drawings.

DETAILED DESCRIPTION OF THE INVENTION

Technical terms are used in the specification with reference to generally-known terminologies used in the technology field. For any terms described or defined in the specification, the descriptions and definitions in the specification shall prevail. Each embodiment of the present disclosure has one or more technical characteristics. Given that each embodiment is implementable, a person ordinarily skilled in the art can selectively implement or combine some or all of the technical characteristics of any embodiment of the present disclosure.

Figure 1:
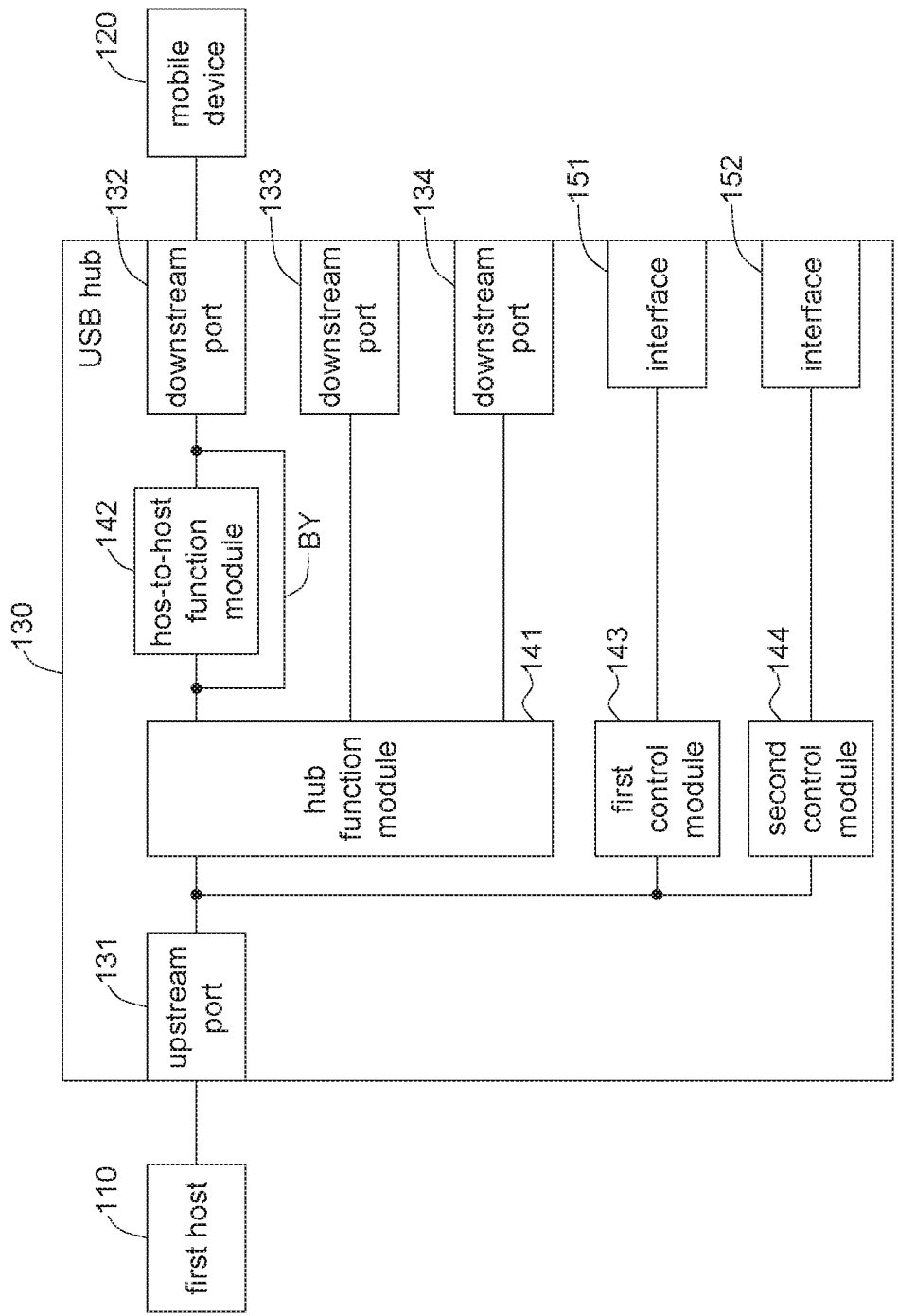
FIG. 1 shows a functional block diagram of a USB hub according to an embodiment of the present disclosure.

Referring to FIG. 1, a functional block diagram of a USB hub according to an embodiment of the present disclosure is shown. As indicated in FIG. 1, the USB hub 130 includes an upstream port 131, a plurality of downstream ports 132-134, a hub function module 141, a host-to-host function module 142, a first control module 143, a second control module 144, and two interfaces 151 and 152. The first host 110 (such as a desk-top computer, a notebook computer or a car system) is connected to the upstream port 131 of the USB hub 130 through a USB interface. The mobile device (such as a smart phone) 120 is connected to the downstream port 132 of the USB hub 130 through a USB interface.

The hub function module 141 is for performing an ordinary hub function (such as host-to-device signal transmission).

When the mobile device 120 (such as a smart phone) connected to the USB hub 130 performs a device role, under the control of the hub function module 141, signals are transmitted between the first host 110 and the mobile device 120 via the bypass path BY instead of the host-to-host function module 142. Conversely, when the mobile device 120 (such as a smart phone) connected to the USB hub 130 switches to a host role from the device role, under the control of the hub function module 141, signals are transmitted between the first host 110 and the mobile device 120 via the host-to-host function module 142 instead of the bypass path BY. That is, in an embodiment of the present disclosure, the "host-to-host mode" may be realized by the host-to-host function module 142, and details are disclosed below.

The first control module 143 and the second control module 144 control the devices connected thereto through the interfaces 151 and 152. For example, the first control module 143 has the function of controlling the storage device, and the second control module 144 has the function of controlling the sound device. Two control modules 143 and 144 are illustrated in FIG. 1, but the present disclosure is not limited thereto. In other possible embodiments of the present disclosure, the hub 130 may include more than two control modules.

Figure 2:
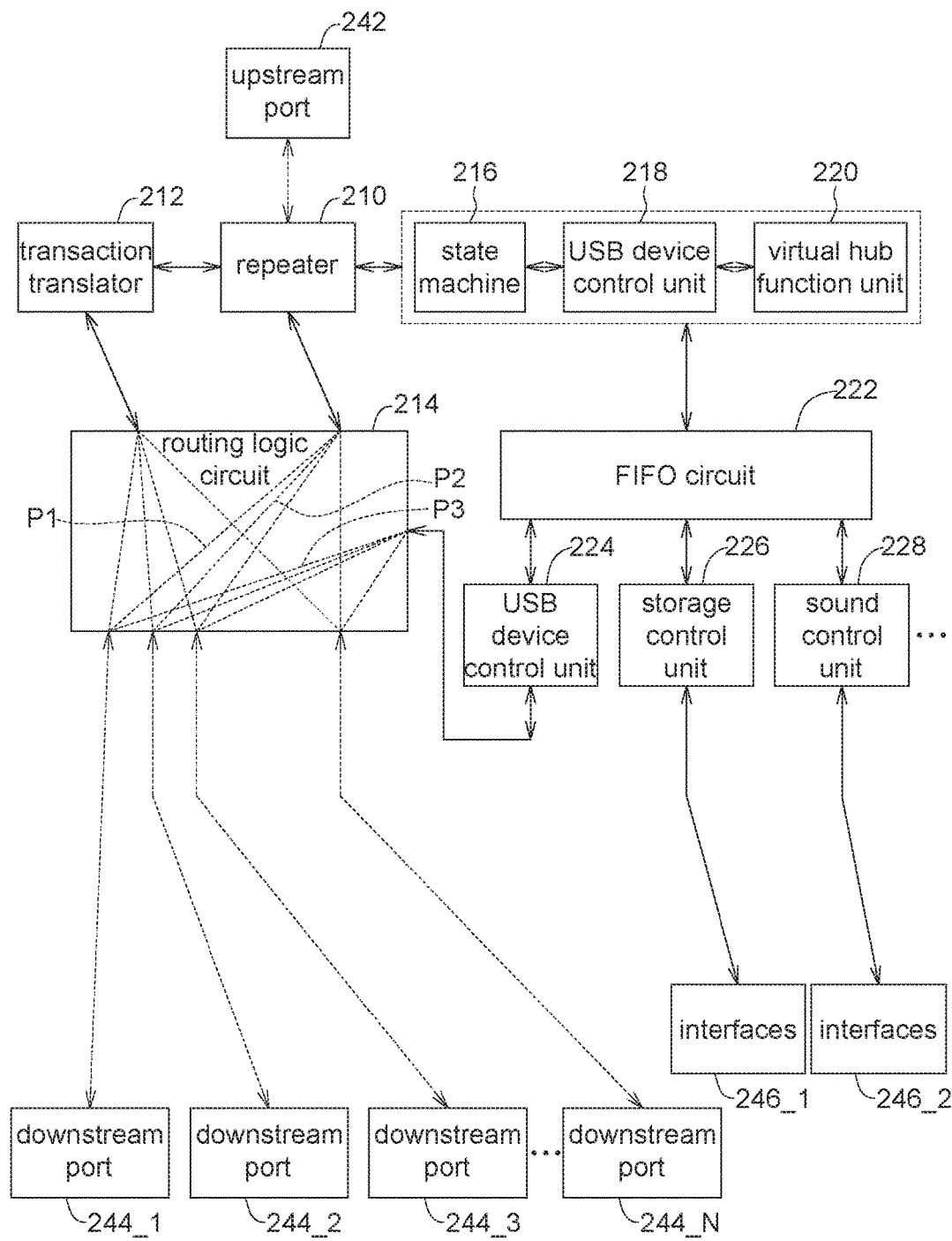
FIG. 2 shows a functional block diagram of a USB hub according to an embodiment of the present disclosure.

Referring to FIG. 2, a functional block diagram of a USB hub 200 according to an embodiment of the present disclosure is shown. As indicated in FIG. 2, the USB hub 200 according to an embodiment of the present disclosure includes a repeater 210, a transaction translator 212, a routing logic circuit 214, a state machine 216, a USB device control unit 218, a virtual hub function unit 220, a first in first output (FIFO) circuit 222, a USB device control unit 224, a storage control unit 226, a sound control unit 228, an upstream port 242, a plurality of downstream ports 244_1-244_N (N is a positive integer), and two interfaces 246_1 and 246_2.

The repeater 210 is used for copying the signal/data outputted from the first host and then transmitting the copied signal/data to the transaction translator 212 or the routing logic circuit 214. Detailed descriptions of the architecture of the repeater 210 are omitted here.

The transaction translator 212 controls high speed transactions, low speed transactions and full speed data transactions, realizes packet conversion between the upstream port and the downstream ports having different speeds, and performs other functions to assure that data transmitted at different speeds on the USB can be correctly transmitted. During transaction translation, the packets outputted from the first host flow to the routing logic circuit 214 through the repeater 210 and the transaction translator 212. When there is no need to perform transaction translation, the packets outputted from the first host flow to the routing logic circuit 214 through the repeater 210. Detailed descriptions of the architecture of the transaction translator 212 are omitted here.

The routing logic circuit 214 is for routing the data so that the data can be transmitted between the upstream port 242 and the downstream ports 244_1-244_N. Detailed descriptions of the architecture of the routing logic circuit 214 are omitted here.

The state machine 216 can decode the signal/data outputted from the first host to determine which downstream port the signal/data should be transmitted to. The state machine 216 can be formed of hardware plus firmware. Detailed descriptions of the architecture of the state machine 216 are omitted here.

The USB device control unit 218 can be executed by hardware or firmware. When the packets outputted from the first host need to be transmitted to the USB peripheral devices having different types of USB, the USB device control unit 218 performs format conversion to the packets. Similarly, when the USB peripheral devices having different types of USB need to be transmitted to the first host, the USB device control unit 218 performs format conversion to the packets. Detailed descriptions of the architecture of the USB device control unit 218 are omitted here.

The virtual hub function unit 220 is for enabling the USB hub to support a compound device and/or a composite device, and the details thereof are disclosed below. In an embodiment of the present disclosure, the virtual hub function unit 220 stores a plurality of virtual USB addresses and supports a virtual hub function, and has the function of specifying the virtual USB address. The state machine 216, the USB device control unit 218 and the virtual hub function unit 220 can form a hub control unit.

The FIFO circuit 222 is interposed between the USB device control units 218 and 224 (or between the USB device control unit 218 and the storage control unit 226 or between the USB device control unit 218 and the sound control unit 228) for storing data outputted from the first host and/or USB peripheral device and/or the mobile device and for transmitting the stored data to the first host and/or the USB peripheral device and/or the mobile device. Detailed descriptions are disclosed below with reference to FIG. 3.

The USB device control unit 224 can be executed by hardware or firmware. The USB device control unit 224 and the USB device control unit 218 have similar or identical functions. In an embodiment of the present disclosure, when the mobile device 120 switches to the host role from the device role, the USB device control units 218 and 224 both perform the device role (the first host 110 and the USB device control unit 218 are paired, and the mobile device and the USB device control unit 224 are paired) to realize the host-to-host mode of the present disclosure. Suppose the mobile device 120 is connected to the downstream port 244_1. When the mobile device 120 performs the device role, the signal path between the first host 110 and the mobile device 120 is formed of the upstream port 242, the repeater 210 (and/or the transaction translator 212), the routing logic circuit 214 and the downstream port 244_1 in sequence.

When the first host 110 commands the mobile device 120 to switch to the host role from the device role, the mobile device 120 temporarily disconnects from the hub 200; meanwhile, the first host 110 sends a command to the USB hub 200. In response to the command, the routing logic circuit 214 switches an internal routing path. After the mobile device 120 switches to the host role, the signal path between the first host 110 and the mobile device 120 is formed of the upstream port 242, the repeater 210, the USB device control unit 218, the FIFO circuit 222, the USB device control unit 224, the routing logic circuit 214 and the downstream port 244_1 in sequence. That is, after the mobile device 120 switches to the host role, the first host 110 still performs the host role, and the USB device control unit 218 still performs the device role. On the other hand, the mobile device 120 performs the host role, and the USB device control unit 224 still performs the device role. Thus, the host-to-host mode can be realized in the embodiments of the present disclosure.

The storage control unit 226 can be realized by a card reader controller of the memory card for controlling the memory card of the interface 246_1 externally connected to the USB hub 200. Or, the storage control unit 226 can be realized by an external hard disk controller for connecting the hard disc drive of the interface 246_1 externally connected to the USB hub 200. However, the present disclosure is not limited thereto. Detailed descriptions of the architecture of the storage control unit 226 are omitted here.

The sound control unit 228 can be used for controlling the peripheral sound device (such as the speaker or the microphone) of the interface 246_2 externally connected to the USB hub 200. Detailed descriptions of the architecture of the sound control unit 228 are omitted here.

The upstream port 242 can be connected to the first host (such as the first host 110 of FIG. 1). The downstream ports 244_1-244_N can be connected to the USB peripheral device (in an illustrative sense rather than a restrictive sense, the USB pen drive, the USB external hard disc drive, and so on). Besides any one of the downstream ports 244_1-244_N can be connected to the mobile device 120.

Refer to FIG. 1 and FIG. 2. As indicated in FIG. 1, the hub function module 141 can be realized by such as the repeater 210, the transaction translator 212 and the routing logic circuit 214. The host-to-host function module 142 can be realized by such as the USB device control unit 218, the FIFO circuit 222 and the USB device control unit 224. The first control module 143 can be realized by such as the USB device control unit 218, the FIFO circuit 222 and the storage control unit 226. The second control module 144 can be realized by such as the USB device control unit 218, the FIFO circuit 222 and the sound control unit 228. That is, in an embodiment of the present disclosure, the hub function module 141, the host-to-host function module 142, the first control module 143 and the second control module 144 can share some units.

The USB device control unit 218, the FIFO circuit 222 and the USB device control unit 224 can perform the host-to-host mode or buffer the built-in data of the USB hub 200. The implementation of the "host-to-host mode" is already disclosed in above embodiments of the present disclosure.

In an embodiment of the present disclosure, when the mobile device switches to the host role from the device role, the first host sends a vendor command to the USB hub 200 to change an internal signal path of the USB hub 200 (as disclosed above) to realize the "host-to-host function" without affecting current data transmission at other downstream ports 244_1-244_N and/or the upstream port 242.

Or, in the USB hub 200 according to an embodiment of the present disclosure, the USB device control unit 224 automatically judges the USB device descriptor of the mobile device connected to any one of the downstream ports 244_1-244_N (if the USB device descriptor specifies that the mobile device can perform the host role) to determine whether to change the host-to-host transmission mode from the host-to-device transmission mode (change an internal signal path of the USB hub 200 as disclosed above) and activate the conversion of the device mode without affecting current data transmission at other downstream ports 244_1-244_N and/or the upstream port 242

Suppose the downstream port 244_1 is connected to the mobile device, and the downstream port 244_2 is connected to the USB pen drive. When the mobile device still performs the device role, within the routing logic circuit 214 (referring to FIG. 2), the signal of the mobile device follows the path P1, and the signal of the USB pen drive follows the path P2. When the mobile device switches to the host role, within the routing logic circuit 214 (referring to FIG. 2), the signal of the mobile device follows the path P3, and the signal of the USB pen drive follows the path P2. That is, in an embodiment of the present disclosure, when the first host commands the mobile device to switch to the host role from the device role, data transmission at other downstream ports is not affected.

Figure 3:
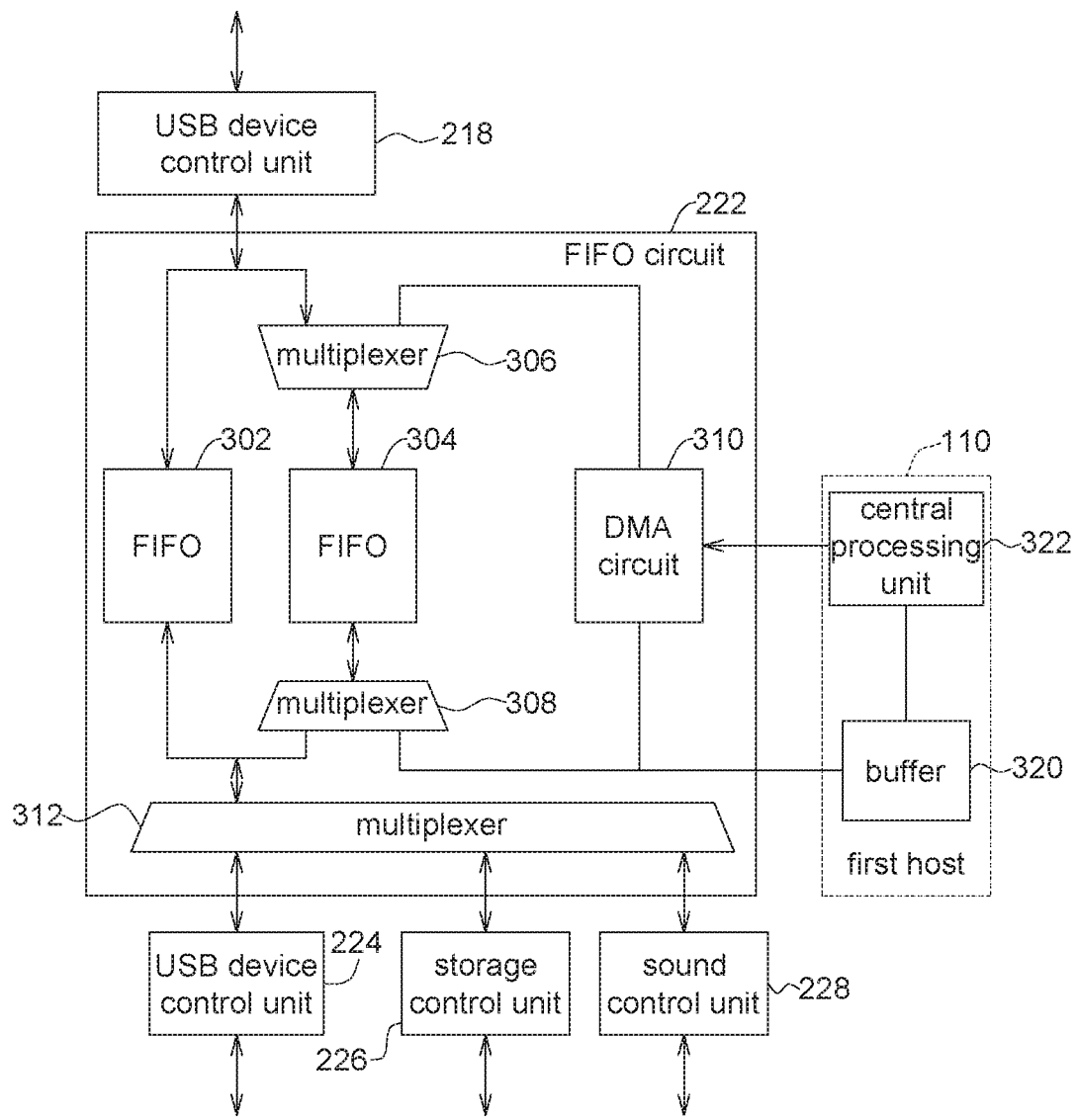
FIG. 3 shows a functional block diagram of an FIFO circuit according to an embodiment of the present disclosure.

FIG. 3 shows a functional block diagram of an FIFO circuit 222 according to an embodiment of the present disclosure. As indicated in FIG. 3, FIFO circuit 222 includes two FIFO circuits 302 and 304, two multiplexers 306 and 308, a direct memory access (DMA) circuit 310 and a multiplexer 312. The FIFO 302 is coupled between the USB device control units 218 and 224. Moreover, the FIFO 304 is coupled to the USB device control units 218 and 224 through the multiplexers 306 and 308 respectively.

In an embodiment of the present disclosure, the FIFO circuit 222 supports fast data transmission path which allows data to be transmitted among the USB device control unit 218, the FIFO 302, the multiplexer 312 and the USB device control unit 224 (and/or the storage control unit 226 and/or the sound control unit 228) at a fast speed. The data flowing through the said path will not be changed by the central processing unit 322.

In an embodiment of the present disclosure, data needs to be processed by the central processing unit 322 before the said data can be transmitted to the other end, and the data transmission process is as follows. Here below, the data transmission process is exemplified by data transmission to the mobile device from the first host, and anyone ordinarily skilled in the technology field of the present disclosure can easily understand data transmission to the first host from the mobile device. The data outputted from the first host is written to the FIFO 304 through the USB device control unit 218 and the multiplexer 306. Then, the DMA circuit 310 buffers data stored in the FIFO 304 and the multiplexer 308 to the buffer 320 of the first host 110. After processing/changing the data buffered in the buffer 320, the CPU 322 of the first host 110 informs the DMA circuit 310 to write the data buffered in the buffer 320 to the FIFO 304 through the multiplexer 306. Then, the data written to the FIFO 304 is transmitted to the USB device control unit 224 through the multiplexer 308 to be transmitted to the mobile device, or is transmitted to the storage control unit 226 to be transmitted to the storage device (not illustrated), or is transmitted to the sound control unit 228 to be transmitted to the sound device (not illustrated).

Or, in an embodiment of the present disclosure, if the CPU 322 wants to transmit data to the mobile device, the storage device or the sound device, the CPU 322 can firstly store the data to the buffer 320, and then buffers the said data to the FIFO 304 through the DMA circuit 310 and the multiplexer 306. Then, the data buffered to the FIFO 304 is transmitted to the USB device control unit 224 through the multiplexer 312 to be transmitted to the mobile device, or is transmitted to the storage control unit 226 to be transmitted to the storage device (not illustrated), or is transmitted to the sound control unit 228 to be transmitted to the sound device (not illustrated).

Or, in an embodiment of the present disclosure, the data is written to the FIFO 304 by the first host through the USB device control unit 218 and the multiplexer 306. Then, the DMA circuit 310 stores the data to the buffer 320 from the multiplexer 308. After changing/processing the data, the CPU 322 informs the DMA circuit 310 to read the changed/processed data from the buffer 320 and then write the said data to the FIFO 304 through the multiplexer 306 instead of transmitting the said data to the USB device control unit 224, the storage control unit 226 or the sound control unit 228. Then, the changed/processed data is stored to the FIFO 304 and will be read only when necessary.

In an embodiment of the present disclosure, the mobile device (such as smart phone) can be used as a host or a device.

Figure 4A:
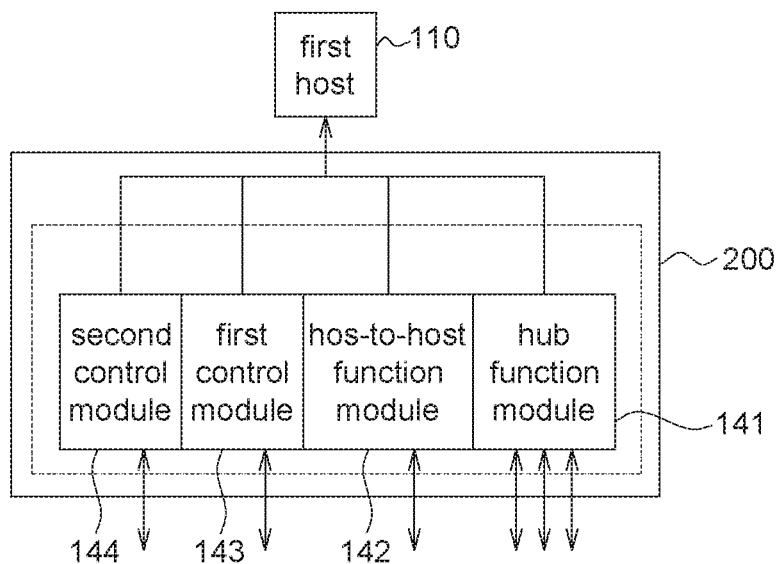
FIG. 4A to FIG. 4C show schematic diagrams of application end according to an embodiment of the present disclosure.
Figure 4B:
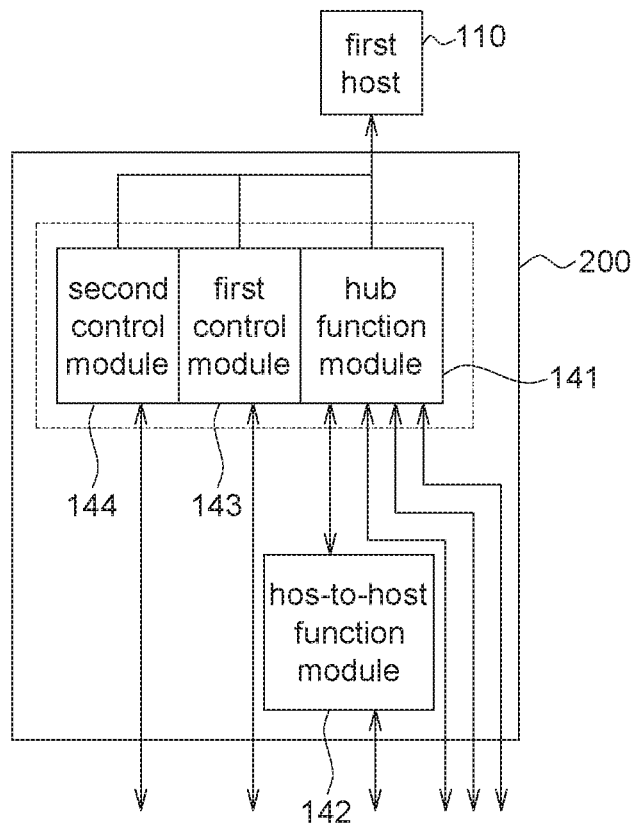
Figure 4C:
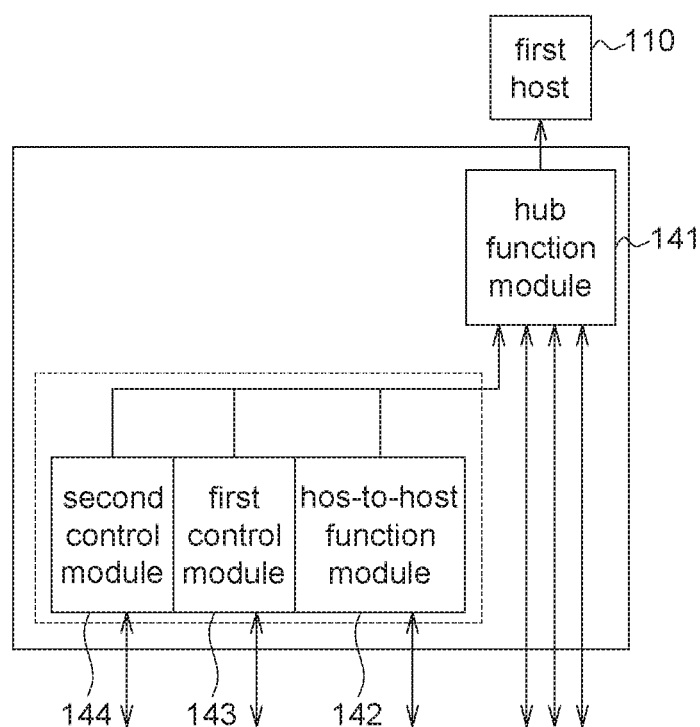

Referring to FIG. 4A to FIG. 4C, schematic diagrams of application end according to an embodiment of the present disclosure are shown. In the application end as indicated in FIG. 4A, based on the feedback of the USB hub 200, the first host 110 identifies that the hub function module 141, the host-to-host function module 142, the first control module 143 and the second control module 144 belong to the same layer, or said the same composite device. During the implementation of FIG. 4A, the first host specifies the USB address (in an illustrative sense rather than a restrictive sense, the USB address is set as 5) to the composite device (including the hub function module 141, the host-to-host function module 142, the first control module 143 and the second control module 144). That is, the hub function module 141, the host-to-host function module 142, the first control module 143 and the second control module 144 share the USB address of 5.

When the USB hub 200 receives the command/data from the first host, the hub function module 141 will check the "interface column" of the USB address of the command/data to determine which of the hub function module 141, the host-to-host function module 142, the first control module 143 and the second control module 144 should the command/data be transmitted to.

Similarly, in the application end as indicated in FIG. 4B, the first host 110 identifies that the hub function module 141, the first control module 143 and the second control module 144 belong to the same layer or said the same composite device. In terms of logic, the first host 110 regards the host-to-host function module 142 as being connected to a downstream port of the hub function module 141.

During the implementation of FIG. 4B, the first host specifies the USB address (in an illustrative sense rather than a restrictive sense, the USB address is set as 5) to an upper layer composite device (which includes the hub function module 141, the first control module 143 and the second control module 144). That is, the hub function module 141, the first control module 143 and the second control module 144 share the USB address of 5. The first host specifies the USB address (in an illustrative sense rather than a restrictive sense, the USB address is set as 6) to the host-to-host function module 142. The virtual hub function unit 220 of the USB hub 200 stores the USB addresses 5, 6 and the relationships between the corresponding devices.

When the USB hub 200 receives the command/data from the first host, the USB hub 200 will check the USB address of the command/data. If the USB address of the command/data is 6, then the USB hub 200 transmits the command/data to the host-to-host function module 142. If the USB address of the command/data is 5, then the USB hub 200 transmit the command/data to the upper layer composite device instead of to a next layer. Besides, if the USB address of the command/data is 5, then the USB hub 200 will check the "interface column" of the command/data to determine which of the hub function module 141, the first control module 143 and the second control module 144 the command/data should be transmitted to.

Similarly, in the application end as indicated in FIG. 4C, with respect to the first host 110, the hub function module 141 is at one layer, while the host-to-host function module 142, the first control module 143 and the second control module 144 belong to another layer (i.e. the same composite device). In terms of logic, the first host 110 regards the composite device as being connected to a downstream port of the hub function module 141. During the implementation of FIG. 4C, the first host specifies the USB address (in an illustrative sense rather than a restrictive sense, USB address is set as 5) to the hub function module 141. The first host specifies the USB address (in an illustrative sense rather than a restrictive sense, the USB address is set as 6) to the next layer composite device which includes the host-to-host function module 142, the first control module 143 and the second control module 144. The virtual hub function unit 220 of the USB hub 200 stores the USB addresses 5-6 and the relationships between the corresponding devices.

When the USB hub 200 receives the command/data from the first host, the USB hub 200 will check the USB address of the command/data. If the USB address of the command/data is 5, then the hub function module 141 receives the command/data. Besides, if the USB address of the command/data is 6, then the USB hub 200 will check the "interface column" of the command to determine which of the host-to-host function module 142, the first control module 143 and the second control module 144 the command/data should be transmitted to.

That is, after switching to the USB host mode from the USB device mode, the mobile device can support the first host, and the first host still can support the USB host mode. Thus, the first host can be connected to other USB peripheral devices through other downstream ports of the USB hub 200 to perform data transmission or application between the first host and other USB peripheral devices. That the mobile device supports the first host refers to the following situations: When the first host is a car system, the mobile device can display the frame on the screen of the first host, so that the user can operate the mobile device through the first host in a manner as if the user were directly operating the mobile device. The user can operate the first host using the functions provided by the mobile device, such as the functions of giving directions, making phone calls, receiving/sending messages, and listening to music.

To summarize, in an embodiment of the present disclosure, according to the vendor command outputted from the first host, the USB hub 200 can switch an internal signal path to support the host-to-host function, and the internal signal path can be switched without affecting current data transmission on other signal paths.

As disclosed above, through the virtual USB hub function of the USB hub 200 (the function of storing the USB address), the USB hub design of the present disclosure can support many situations at the application ends (as indicated in FIG. 4A to FIG. 4C), and therefore increase the flexibility of use.

While the invention has been described by way of example and in terms of the embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A universal serial bus (USB) hub, comprising:
an upstream port coupled to a first host;
a first USB device control unit coupled to the upstream port for performing packet format conversion;
a first in first out (FIFO) circuit coupled to the first USB device control unit for storing data from the first host;
a second USB device control unit coupled to the FIFO circuit for performing packet format conversion; and
a plurality of downstream ports coupled to the second USB device control unit,
wherein when any one of the downstream ports is coupled to a mobile device,
if the first host requests the mobile device to switch to a master device from a slave device, the mobile device temporarily disconnects from the USB hub, and the first host requests the USB hub to change an internal routing path,
after the mobile device switches to the master device, the first host still acts as the master device, and the first USB device control unit acts as the slave device; the mobile device acts as the master device, and the second USB device control unit acts as the slave device, wherein the first host and the first USB device control unit are paired, and the mobile device and the second USB device control unit are paired.

2. The USB hub according to claim 1, wherein the first host outputs a vendor command to request the mobile device to switch to the master device from the slave device without affecting current data transmission at other downstream ports.

3. The USB hub according to claim 1, wherein the second USB device control unit automatically judges a USB device descriptor of the mobile device connected to the any one downstream port to determine whether to switch to a host-to-host transmission mode from a host-to-device transmission mode and to change the internal routing path of the USB hub without affecting current data transmission at other downstream ports.

4. The USB hub according to claim 1, wherein the FIFO circuit comprises:
a first FIFO circuit coupled between the first and the second USB device control unit;
a second FIFO circuit,
a first multiplexer, a second multiplexer and a third multiplexer, wherein the second FIFO circuit is coupled to the first USB device control unit through the first multiplexer, the second FIFO circuit is coupled to the second USB device control unit through the second multiplexer and the third multiplexer, and
a direct memory access (DMA) circuit coupled to the first and the second multiplexer.

5. The USB hub according to claim 4, wherein data from the first host is transmitted to the mobile device or a USB device connected to one of the downstream ports through the first USB device control unit, the first FIFO circuit and the second USB device control unit.

6. The USB hub according to claim 4, wherein
data from the first host flows through the first USB device control unit and the first multiplexer to the second FIFO circuit and is buffered to a buffer of the first host through the second multiplexer,
after a central processing unit of the first host processes or changes data buffered in the buffer, the central processing unit informs the DMA circuit to read the changed or processed data from the buffer and then writes the changed or processed data to the second FIFO circuit through the first multiplexer; the changed or processed data is transmitted to the second USB device control unit through the second multiplexer and the third multiplexer to the mobile device or to a USB device connected to one of the downstream ports.

7. The USB hub according to claim 4, wherein
data from the first host flows through the first USB device control unit and the first multiplexer to the second FIFO circuit and is buffered to a buffer of the first host through the second multiplexer,
after a central processing unit of the first host processes or changes data buffered in the buffer, the central processing unit informs the DMA circuit to read the changed or processed data from the buffer and then writes the changed or processed data to the second FIFO circuit through the first multiplexer.

8. A universal serial bus (USB) hub, comprising:
an upstream port coupled to a first host;
a hub function module coupled to the upstream port for performing a hub function;
a host-to-host function module coupled to the upstream port, wherein when the mobile device connected to the USB hub acts as a slave device, under control of the hub function module, signals are transmitted between the first host and the mobile device flows via a bypass path or the host-to-host function module, which realizes a "host-to-host mode";
at least one control module coupled to the upstream port for controlling at least one device connected to the at least one control module;
a virtual hub function unit coupled to the hub function module, the host-to-host function module and the at least one control module, wherein the virtual hub function unit supports a virtual hub function and stores a plurality of USB addresses, and has a function of storing a relationship between the USB address and relevant devices; and
a plurality of downstream ports coupled to a second USB device control unit,
the virtual hub function unit assigns respective virtual USB address of the hub function module, the host-to-host function module and the at least one control module according to a USB address assigned by the first host.

9. The USB hub according to claim 8, wherein
the USB hub determines a transfer destination of a command according to an interface column of the command outputted from the first host.

* * * * *